Oct. 18, 1938.                B. O'BRIEN                2,133,562
METHOD AND MEANS FOR DETERMINING OPTICAL CHARACTERISTICS OF SUBSTANCES
                    Filed Jan. 9, 1934        2 Sheets-Sheet 1
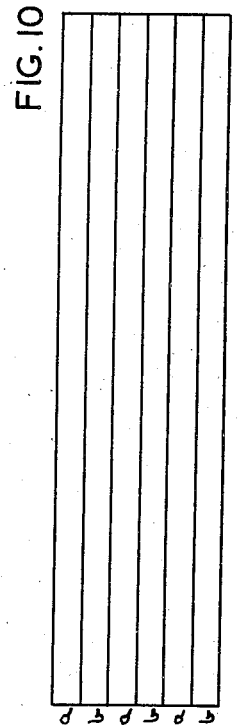
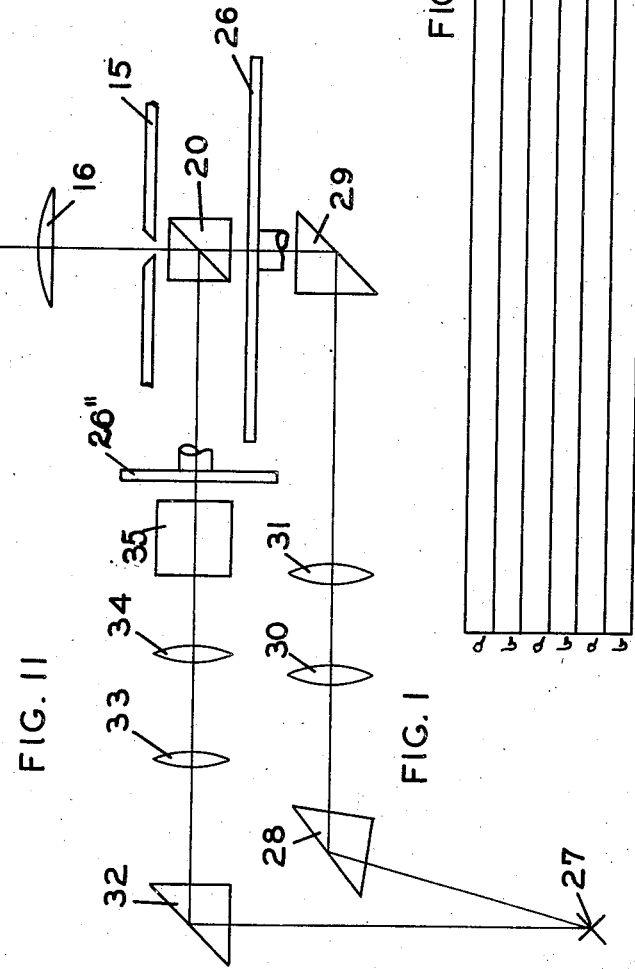
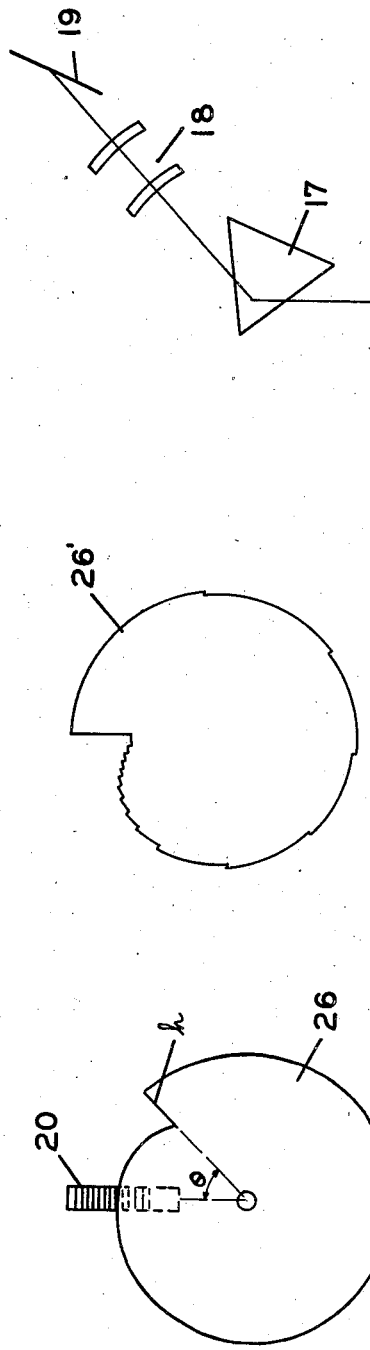
BRIAN O'BRIEN
INVENTOR
BY *G. A. Ellestad*
ATTORNEY Oct. 18, 1938.   B. O'BRIEN   2,133,562
METHOD AND MEANS FOR DETERMINING OPTICAL CHARACTERISTICS OF SUBSTANCES
Filed Jan. 9, 1934   2 Sheets-Sheet 2

BRIAN O'BRIEN
INVENTOR

BY *G. H. Ellestad*
ATTORNEY

Patented Oct. 18, 1938

2,133,562

UNITED STATES PATENT OFFICE 2,133,562

METHOD AND MEANS FOR DETERMINING OPTICAL CHARACTERISTICS OF SUBSTANCES

Brian O'Brien, Rochester, N. Y.

Application January 9, 1934, Serial No. 705,904

12 Claims. (Cl. 88—14)

This invention relates to methods and means for determining quantitative characteristics of radiation and more particularly it has reference to methods and means for determining optical characteristics of substances such as by spectrophotometric measurements, for example.

One of the objects of my invention is to provide improved methods and means for determining optical characteristics by spectrophotometric measurements. Another object is to provide methods and means for comparing two quantities of radiant energy by producing a plurality of spaced representations of each of the quantities with the representations of one quantity positioned, respectively, between the representations of the other quantity. Still another object is to provide methods and means whereby interpositioned spectra produced from a plurality of light beams may be simultaneously produced and photographically recorded.

Another object is to provide methods and means for comparing two quantities of radiant energy by simultaneously producing a plurality of spaced spectra of each quantity with the spectra of the two quantities alternately positioned and with the spectra of one or both quantities graded in intensity in a known manner. A still further object is to provide a spectrograph having a plurality of spaced opaque members positioned closely to and along its slit. Another object is to provide a spectrograph having a plurality of spaced reflecting members positioned along its slit and means adjacent to said members for varying in a known manner the intensity of light which passes between or onto said members. These and other objects and advantages reside in certain novel features of construction, arrangement and combination of parts and in the methods of constructing, arranging and combining the parts all as will hereinafter be more fully described and pointed out in the appended claims.

Referring to the drawings:

Fig. 1 is a schematic plan view of a spectrograph and apparatus embodying my invention.

Fig. 2 is a face view of the logarithmic spiral sector showing its position relative to the light reflecting device.

Fig. 10 illustrates, diagrammatically, the alternate positioning of the spectra produced by my apparatus.

Fig. 11 shows a modified type of spiral sector disk.

Figure 3:
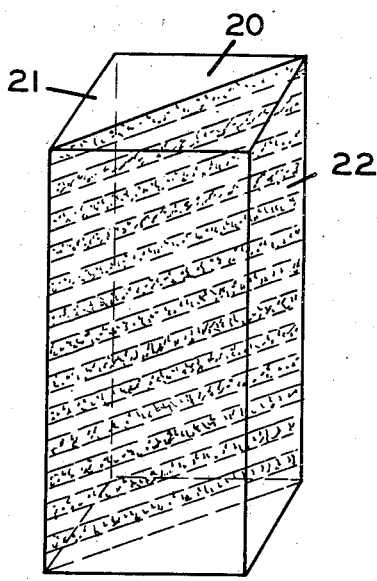
Fig. 3 is an enlarged perspective view of the light reflecting device which is placed close to the slit of the spectrograph.
Figure 4:
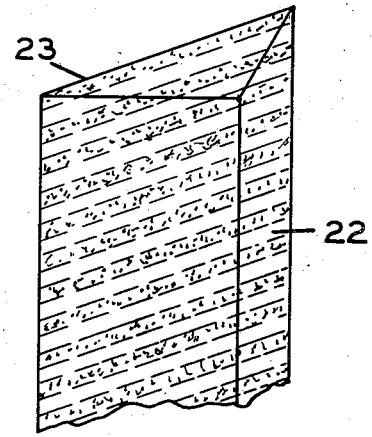
Fig. 4 is another view of a portion of the device.

A preferred embodiment of my invention is shown in the drawings wherein 15 indicates the slit of a well known type of spectrograph embodying a collimator lens 16, the prism 17, an objective 18 and the photographic plate 19. Positioned as closely as possible to slit 15 is a light reflecting device indicated generally at 20 which is made up of the two prismatic members of glass or quartz 21 and 22. The hypotenuse face 23 of member 22 is provided with a series of spaced etched or ground grooves 24 which extend horizontally across the face so that the clear, polished spaced portions 25 define the surface 23. The members 21 and 22 are held together so that the polished hypotenuse face of member 21 is in optical contact with the polished portions 25 on member 22 so that the device somewhat resembles the well known Lummer-Brodhun photometric cube in structure. In one embodiment, to be used with a spectrograph having a slit 20 mm. high, the light reflecting device 20 is approximately 20 mm. high and 4 mm. square. The polished portions 25 which are in optical contact with prism 21 are approximately 0.3 mm. wide with every fifth portion about 0.5 mm. wide so as to provide orientation means on the spectrograms as will hereinafter be described. The first and fifth grooves 24 are 0.7 mm. wide while the second, third and fourth grooves are 0.6 mm. wide. Although a light reflecting device of the foregoing dimensions will function satisfactorily it is to be understood that variations can be made in the dimensions without departing from my invention.

Positioned directly in front of the light reflecting device is the disk diaphragm 26 which is adapted to be rotated by any suitable means such as an electric motor, not shown. As shown in Fig. 2, the disk 26 has the form of a logarithmic spiral sector with the depth of the notch indicated by $h$. The spiral edge of the disk may be continuous or it may be stepped as shown at 26' in Fig. 11.

Figure 6:
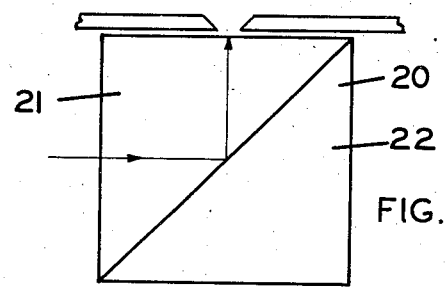
Figs. 6 and 7 illustrate the passage of two different light beams through the device of Fig. 4.
Figure 5:
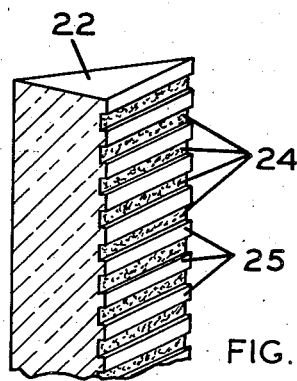
Fig. 5 shows the structure of the portion in Fig. 4.
Figure 7:
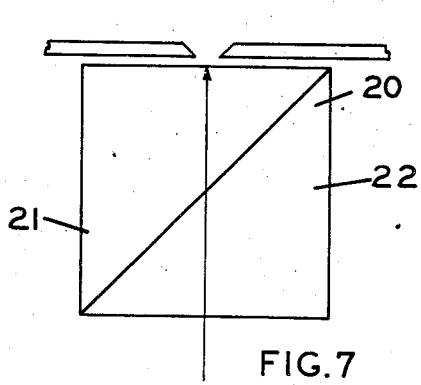

A suitable light source 27 is so positioned that a beam of light will strike prism 28 and be directed by prism 29 through device 20 and into slit 15, with the cylindrical lens 30 acting as a collimator and the lens 31 acting to image the source, in a horizontal plane, on slit 15. Similarly another beam of light from source 27 passes to the left of prism 28 and is reflected by prism 32 after which it is collimated by cylindrical lens 33 and the source is imaged, in a horizontal plane, by lens 34 on the slit 15. As will be apparent, the part of the first mentioned beam which reaches slit 15 has passed through the device 20 at the portions 25 which are in optical contact with the face of prismatic member 21. The path of these rays is indicated in Fig. 7. The only part of the second mentioned beam which reaches the slit 15 has been totally reflected by the hypotenuse face of member 21 at the points which are opposite the grooves or air spaces 24 on the face 23 of member 22. The path of such rays is indicated in Fig. 6. In order to make the optical paths of both beams equal a compensating block of glass or quartz 35 is placed in the path of the second mentioned beam.

Figure 9:
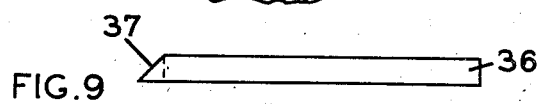
Fig. 9 is a top plan view thereof.
Figure 8:
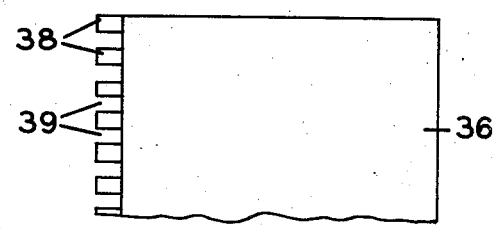
Fig. 8 shows a modified type of light reflecting device.

In Figs. 8 and 9 I have shown a modified type of device which can be used in place of device 20. This modification comprises a flat piece of stainless steel 36 having an inclined face 37 which is highly polished so as to serve as a reflector. The face 37 is slotted as shown in Fig. 8 so as to provide a plurality of spaced reflecting members 38 separated by open slots 39. This member is positioned before the slit 15 and one beam passes through the slots 39 and into the slit while the other beam is reflected by members 38 into the slit.

The intensity range can be increased by employing another spiral sector 26'' which would be positioned in the beam in which the sample is located. The sectors can either be located adjacent to the device 20 or they can be imaged at the device by suitable lenses.

With the foregoing structure, it will be apparent that one light beam will produce a series of spaced spectra at the plate 19 and that the other beam will produce another series of spaced spectra at the plate 19 with the two series arranged in an alternating or interlaced position so that each spectrum of one series will be positioned between adjacent spectra of the other series as shown at $a$ and $b$ in Fig. 10.

In operation my device may be used for determining the optical characteristics of a substance, such, for example, as the transmission of a transparent substance. The substance whose transmission is desired is provided with parallel bounding faces and positioned between lenses 33 and 34 so that the spectra produced by this beam will be reduced in intensity according to the spectral transmission of the substance. In the other beam the spiral sector disk 26 is rotated in front of device 20 so that the spectra produced by this beam will be graded in intensity from one spectrum to the other in a known manner. In this case the spectra will be reduced in average intensity by amounts proportional to the logarithm of their distance from the image of the top of the slit. The apparent height of the spectrum line is proportional to the logarithm of the photographic intensity of that line. This follows because the average intensity transmitted through the sector to any point of the slit is proportional to $\theta$, the angular opening of the sector corresponding to that point. The angle $\theta$ is related in turn to the height $h$ of that point above the reference base point on the slit according to the equation:

$$h = a + \log_{10}\left(\frac{\theta}{2\pi}\right)$$

The complete transmission curve may be determined from the single photograph of the multiple series of spectrum pairs by the conventional method of spotting points in adjacent spectra where the photographic density of the two sets corresponds.

It will be evident that there are various modifications of the optical system by which the same results may be obtained. Although I have described the use of my apparatus for the measurement of transmission it can also be used for measurement of reflection characteristics by making the necessary modifications. For purposes of identification of the various members of the multiple series of spectra with reference to the base point the reflecting and transmitting portions of device 20 may be made with different widths as hereinbefore stated.

From the foregoing it will be apparent that I am able to attain the objects of my invention and provide improved methods and means for comparing quantities of radiant energy and determining optical characteristics of substances. My method and apparatus makes it possible to simultaneously produce a series of spaced spectra of one beam of unknown intensity and at the same time to produce a series of spaced comparison spectra of another beam whose intensity has been varied in a known manner. This is a vast improvement over the prior art practice since all spectra can be produced simultaneously and photographed at one exposure while under the prior art practice the various pairs of spectra were photographed successively so that the results were often vitiated due to the fact that the light source or even the substance under test might have changed in character during the time required to photograph the several pairs of spectra. It is obvious that with my method and apparatus the optical characteristics of substances can be determined rapidly and without opportunity for errors due, for example, to incorrect settings of the sector openings employed in the usual manner under the prior art practice.

I claim:

1. A method of spectrum analysis which comprises producing a series of spaced spectra of a standard quantity, varying the spectra in a known manner throughout the series, simultaneously producing a series of spaced spectra of a second quantity in alternating relation with the spectra of the standard quantity, and comparing the two series of spectra.

2. A method of comparing two quantities of radiant energy which comprises producing substantially simultaneously a plurality of spaced, spectral representations of each of said quantities with the representations of one quantity being positioned in alternating relation with the representations of the other quantity, varying the intensities of the respective representations of both quantities in a known manner and comparing the corresponding representations of both quantities.

3. A method of determining optical characteristics of a substance which comprises modifying a beam of light from a source with the substance, directing and dispersing the beam so as to provide a series of spaced spectra while simultaneously varying in a known manner another beam of light from said source and directing and dispersing it so as to provide a second series of spectra which are positioned, respectively, between the spectra of the first named series and comparing the two series of spectra.

4. Apparatus for comparing two quantities of radiant energy comprising means for producing a series of spaced spectral representations of the first quantity, means for simultaneously producing a series of spaced spectral representations of the second quantity in alternating relation to the representations of the first quantity, means for varying the intensity of the representations of one of the quantities in a known manner, and means for photographically recording all of the representations at one exposure.

5. A device of the character described comprising a spectrograph having a slit, a plurality of spaced opaque members positioned closely to and along said slit, each of said members having a reflecting face, means for directing a light beam into said slit between said members, means for directing a second light beam onto the reflecting faces of said members and thence into said slit and means for varying the intensity of said light beams.

6. A device of the character described comprising a spectrograph having a slit, a plurality of spaced reflecting members positioned closely to and along said slit, means for directing a light beam into said slit between said members, means for directing a second light beam onto said members and thence into said slit and a rotating sector positioned adjacent to said members for varying the intensity of one of said beams in a known manner.

7. A device of the character described comprising a spectrograph having a slit, a plurality of spaced reflecting members positioned closely to and along sad slit, means for directing a light beam into said slit between said members, means for directing a second light beam onto said members and thence into said slit and a rotating sector positioned in each beam for varying the intensities of said beams in a known manner.

8. Apparatus for determining the optical characteristics of a substance comprising a spectrograph having a slit, a plurality of spaced light reflecting members positioned closely to and along said slit, a light source, means for directing a light beam from said source through the spaces between said members and into the slit, means for directing a second light beam from said source onto said reflecting members and thence into the slit, means for modifying one of said light beams by the substance and means for varying the intensity of the unmodified light beam in a known manner.

9. A device of the character described comprising a spectrograph having a slit, a plurality of spaced light directing members positioned adjacent to and along said slit, means for sending a light beam between said members and into said slit, means for sending a second light beam onto said directing members and thence into said slit, and means for varying one of said light beams in a known manner.

10. A method of determining optical characteristics of a substance which comprises modifying a light beam by means of the substance, directing and dispersing the modified beam so as to form a series of spaced spectra while simultaneously varying another light beam in a known manner and directing and dispersing it to form a second series of spaced spectra with the spectra of the two series positioned in adjacent, alternating relationship and then comparing the two series of spectra.

11. A method of determining optical characteristics of a substance which comprises modifying a light beam by means of the substance, directing and dispersing the modified beam so as to form a series of spaced spectra, simultaneously directing and dispersing another light beam to form a series of spaced spectra with the spectra of the two series positioned in adjacent, alternating relationship, varying one of said light beams in increments from spectrum to spectrum in its series and then comparing the two series of spectra.

12. A device of the character described comprising a spectrograph having a slit, a plurality of spaced, light deflecting members positioned closely to and along said slit, means for directing a light beam into said slit between said members, means for directing a second light beam onto said members and thence into said slit, and means for varying one of said light beams in increments along said slit.

BRIAN O'BRIEN.